(12) United States Patent
Bushko

(10) Patent No.: US 7,124,790 B2
(45) Date of Patent: Oct. 24, 2006

(54) SYSTEM AND METHOD FOR STORING AND DISCHARGING HYDROGEN

(75) Inventor: Wit Cezary Bushko, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 215 days.

(21) Appl. No.: 10/878,153

(22) Filed: Jun. 28, 2004

(65) Prior Publication Data

US 2005/0287407 A1 Dec. 29, 2005

(51) Int. Cl.
*B65B 1/04* (2006.01)

(52) U.S. Cl. .......................................... 141/82; 62/46.2

(58) Field of Classification Search .................... 141/2, 141/18, 98, 82, 302; 62/46.2
See application file for complete search history.

(56) References Cited

U.S. PATENT DOCUMENTS

| | | | | |
|---|---|---|---|---|
| 4,995,235 A | * | 2/1991 | Halene | 62/46.2 |
| 6,182,717 B1 | * | 2/2001 | Yamashita | 141/82 |
| 6,378,601 B1 | | 4/2002 | Ovshinsky et al. | 165/104.12 |
| 6,591,616 B1 | * | 7/2003 | Ovshinsky et al. | 62/46.2 |
| 6,672,078 B1 | | 1/2004 | Ovshinsky et al. | 62/46.2 |
| 6,782,914 B1 | * | 8/2004 | Kami et al. | 137/312 |
| 2001/0025670 A1 | | 10/2001 | Ovshinsky et al. | 141/231 |
| 2002/0029821 A1 | | 3/2002 | Ovshinsky et al. | 141/231 |
| 2002/0073618 A1 | | 6/2002 | Ovshinsky et al. | 48/61 |

FOREIGN PATENT DOCUMENTS

| WO | WO 02/056396 | 7/2002 |
|---|---|---|
| WO | WO 02/087741 | 11/2002 |

* cited by examiner

*Primary Examiner*—Steven O. Douglas
(74) *Attorney, Agent, or Firm*—Fletcher Yoder

(57) ABSTRACT

A hydrogen fuel system comprises an open gas circuit that includes a source of hydrogen. The hydrogen fuel system also includes a compressor that forces a flow of hydrogen from the source of hydrogen through the open gas circuit, and a hydrogen storage vessel comprising an inlet and an outlet. The hydrogen fuel system may also include a hydrogen storage bed being disposed within the hydrogen storage vessel between the inlet and the outlet, the hydrogen storage vessel being adapted to form a portion of the open gas circuit so that the hydrogen storage bed is cooled by convection while hydrogen flows through the open gas circuit.

45 Claims, 5 Drawing Sheets

SYSTEM AND METHOD FOR STORING AND DISCHARGING HYDROGEN

BACKGROUND

The invention relates generally to a system and method for the efficient storing and discharging of hydrogen in a hydrogen storage system.

Hydrogen is currently considered as a potentially useful energy source. One of the challenges in utilizing hydrogen has been the need for simple, efficient, reliable and cost-effective techniques for compressing, storing and releasing hydrogen.

It is generally known that hydrogen may be stored in compressed gaseous form in pressure vessels or at low temperature as liquid hydrogen. It is also known that hydrogen may be stored in storage vessels that contain powdered metal hydrides. The collection of metal hydrides in a storage vessel is referred to as a bed. Metal hydrides comprise metal atoms that constitute a host lattice. The host lattice traps hydrogen atoms in interstitial sites, such as lattice defects. Storage of hydrogen as a solid hydride provides greater volumetric storage density compared to that of compressed hydrogen gas or liquid hydrogen in pressure vessels. However, in such solid hydride systems, an important consideration is the ability to repeatedly charge and discharge hydrogen while retaining the hydrogen storage capability of the storage vessel.

The hydrogenation process of metals and metallic alloys is an exothermic process. The heat released during hydrogenation or absorption of hydrogen storage alloys must be removed in order to store the hydrogen in the metal hydrides. Ineffective heat removal can cause the hydrogenation process to slow down or terminate. Unless heat is effectively removed from the metal hydride powder when hydrogen is added to the storage vessel, it may not be practical to fill the storage vessel with usable hydrogen in a reasonably short time period. Consumers will not be motivated to use hydrogen as a fuel if it takes an unreasonably long time to refuel the on-board hydrogen storage vessel of the vehicle. Thus, effective heat removal from the metal hydride powder during hydrogenation is an important aspect of being able to practically use hydrogen for many applications such as a fuel for vehicles.

A related issue is that heat also needs to be generated to release stored hydrogen when the hydrogen fuel stored in a storage vessel is used. This process may also be referred to as dehydrogenation or desorption. For these reasons, effective thermal management of the hydrogen storage material is an important aspect related to the reliable hydrogenation and dehydrogenation of metal hydrides or other storage materials.

In typical systems, hydrogen storage vessels are coupled with heat exchangers or the like to cool the metal hydride bed during charging. In this process, cooling water or the like is circulated into the hydrogen storage tank to cool the metal hydride bed, thereby providing an increase in the amount of hydrogen absorbed. The heat exchanger may also be employed to introduce heat into a hydrogen storage vessel to begin the process of dehydrogenation or desorption.

Conventional systems may include heat sinks or heat distribution fins thermally coupled to the heat exchanger or hydrogen storage vessel to dissipate heat during hydrogenation and dehydrogenation. Heat dissipation may also be facilitated using heat pipes. Thus, typical hydrogen systems rely on heat conduction as a primary mechanism of extracting excess heat during refueling and heating storage bed during hydrogen release. The process of heat removal from a bulk of the storage bed is slow because it relies on the heat conduction through metal hydride powder, which is a poor heat conductor. Heat conduction is usually highly restricted through a powdery storage bed typical for metal hydrides and therefore results in slow charging of hydrogen in the metal hydride. In addition, the complex distribution lines for the cooling medium such as water or the like results in excess increase in the overall weight of the storage system. This additional weight reduces the effectiveness of hydrogen systems for use in vehicles. There is a need, therefore, for an improved system and method of hydrogenating and dehydrogenating a hydrogen storage vessel.

BRIEF DESCRIPTION

In accordance with one aspect of the present technique, a hydrogen fuel system is provided which includes an open gas circuit having a source of hydrogen, a compressor that forces a flow of hydrogen from the source of hydrogen through the open gas circuit and a hydrogen storage vessel having an inlet and an outlet. A hydrogen storage bed is being disposed within the hydrogen storage vessel and is being adapted to form a portion of the open gas circuit so that the hydrogen storage bed is cooled by convection while hydrogen flows through the open gas circuit. In accordance with one aspect, the hydrogen storage vessel is disposed in a vehicle, the hydrogen gas is been transmitted to the vehicle's power conversion unit via a plurality of interconnecting pipelines, and valves for flow control of hydrogen.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
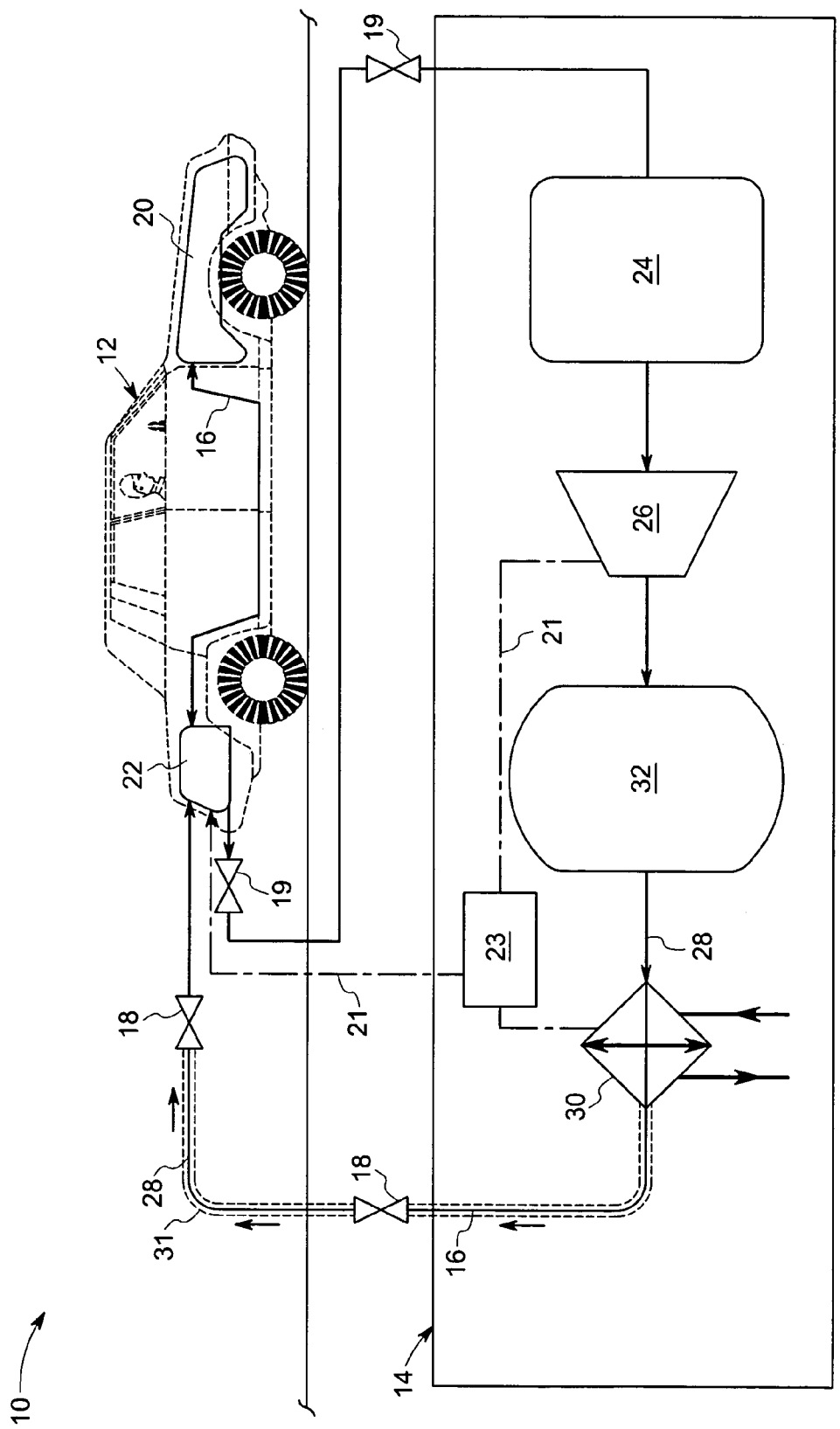
FIG. 1 is a schematic diagram of a hydrogen fuel station in accordance with an exemplary embodiment of the present technique.

The present technique discloses a system and method for charging and discharging hydrogen from a hydrogen storage vessel with a heat transfer system. In one embodiment, the hydrogen storage vessel is disposed on a vehicle for use in providing fuel to the power conversion unit of the vehicle.

In the description of the figures below, like features are designated with like reference numerals in each figure where possible.

Turning now to the drawings, FIG. 1, illustrates a hydrogen fuel system 10. The hydrogen fuel system 10 comprises a vehicle 12 and a hydrogen filling system 14 connected by a plurality of interconnecting pipelines 16 and 17 for transfer of hydrogen between the hydrogen fuel system 10 and the vehicle 12. A plurality of valves 18 and 19 is provided for flow control of hydrogen. Those of ordinary skill in the art will appreciate that the positions shown for the valves 18 and 19 are a matter of design choice and not an essential aspect of the present technique. The vehicle 12 comprises a vehicle's power conversion unit 20. The vehicle power conversion unit 20 may be an internal combustion engine, a fuel cell or the like. The vehicle further comprises a hydrogen storage vessel 22 for storing hydrogen for use as fuel to power the power conversion unit 20. Data line 21 delivers information about pressure and temperature in the hydrogen storage vessel 22 and the compressor 26.

The hydrogen filling system 14 as indicated above, further comprises a filling system control unit 23, source of hydrogen 24, a hydrogen compressor 26 for compressing the flow of hydrogen and ensuring appropriate pressure difference for transferring the hydrogen from the source of hydrogen 24 to the hydrogen storage vessel 22. The source of hydrogen 24 could be a liquid hydrogen vessel coupled to a vaporizer, a compressed gas vessel, an electrolyzer or reformer coupled to a storage vessel or the like. In one embodiment, as shown in FIG. 1, the hydrogen filling system 14 further comprises a heat exchanger 30 adapted to cool the hydrogen before it is returned for the storage in the hydrogen storage vessel 22. An external refrigeration system (not shown) for heat exchanger 30 must be capable of maintaining hydrogen temperature in the hydrogen storage vessel 22 below an absorption plateau temperature of the storage material for the desired gas pressure and hydrogen flow rate. Hydrogen delivery line from the heat exchanger 30 to the hydrogen storage vessel 22 is covered with a thermal insulator 31. The compressor 26 maintains pressure in a buffer vessel 32 above the hydrogen source pressure. Efficiencies of the heat exchanger 22 and compressor 26 determine the maximum possible hydrogen-charging rate of the entire system. The buffer vessel 32 may be kept at a relatively high pressure as compared to the hydrogen storage vessel 22. The filling system control unit 23 controls the operation of the compressor 26 and the heat exchanger 30.

Figure 2:
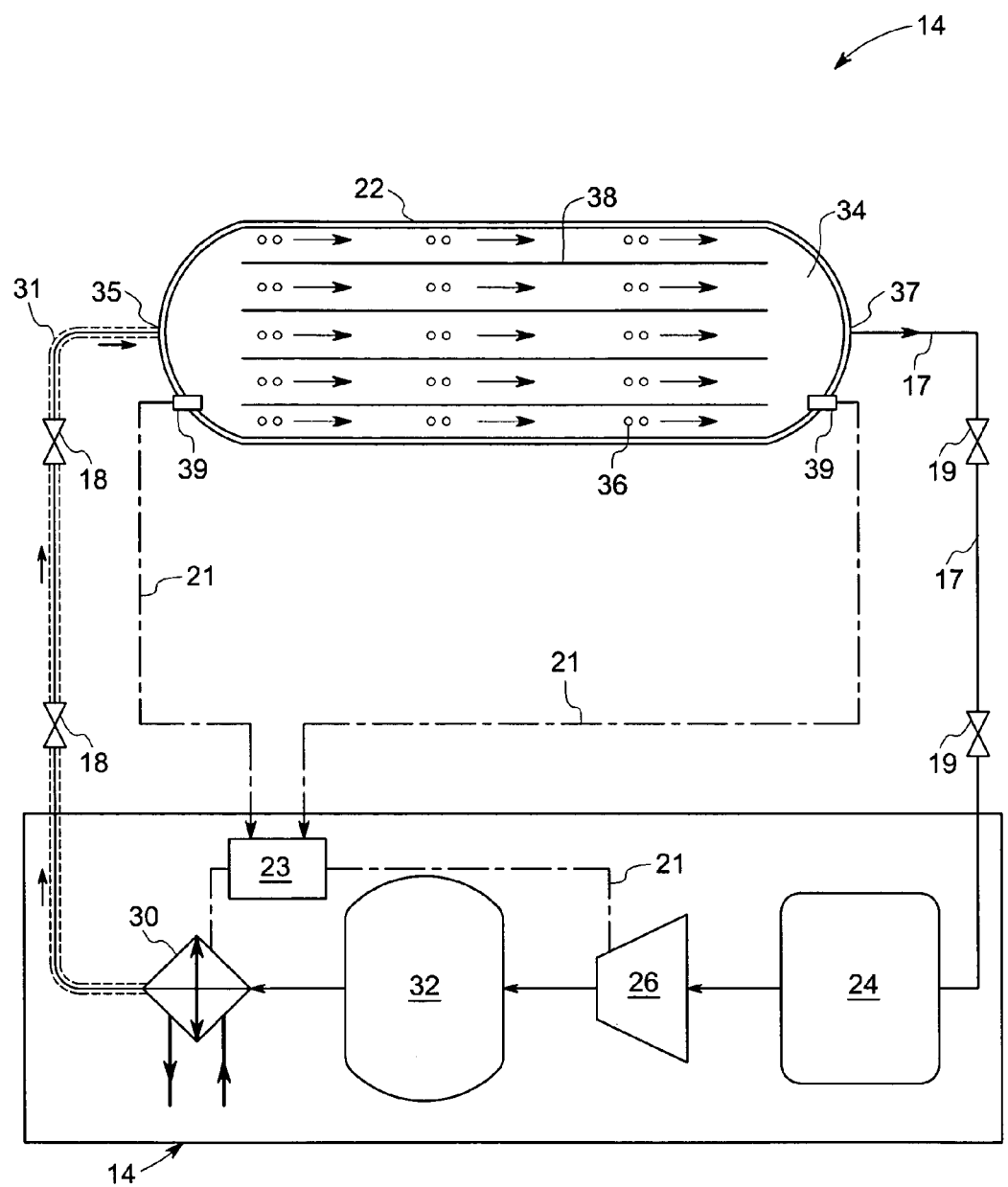
FIG. 2 is a schematic diagram illustrating the charging of hydrogen gas in a hydrogen storage vessel in accordance with an exemplary embodiment of the present technique.

Referring generally to FIG. 2, the open gas circuit illustrated in FIG. 1 is explained in detail. The hydrogen storage vessel 22 described above may comprise a hydrogen storage bed 34 containing a hydrogen storage metal alloy 36. The hydrogen storage vessel 22 further comprises an inlet 35 and an outlet 37 to accommodate the flow of hydrogen. Any metal alloy which safely and efficiently stores and releases hydrogen may be used as the hydrogen storage metal alloy 36. Examples of such metals include but are not limited to $AB$, $AB_2$, $AB_5$, $A_2B$ and $M_x(AlH_3)_yH_z$ and $AlH_3$, or a combination of the above. (A, B, and M are metals and the value of x lies between 1 and 3, the value of y lies between 1 and 2 and the value of z lies between the value of x and twice the value of x.). In one embodiment of the hydrogen fuel system 10, the buffer vessel 32 is adapted to recapture the unabsorbed hydrogen from the hydrogen storage vessel 22 during charging and to maintain a substantial high-pressure for easy flow of hydrogen in the hydrogen fuel system 10 due to differential pressure.

When the hydrogen storage vessel 22 is being filled, the hydrogen storage metal alloy 36 contained inside the hydrogen storage bed 34 absorbs hydrogen, thereby producing a considerable amount of heat (heat of hydride formation). If the heat is not removed, the rate of absorption of hydrogen into the hydrogen storage metal alloy 36 is decreased and the time for refueling the hydrogen storage vessel 22 is increased. The heat released by the absorption of the hydrogen into the hydrogen storage metal alloy 36 must be removed fast enough to sustain an acceptable absorption rate of hydrogen into the hydrogen storage metal alloy 36 thereby minimizing the time needed for refueling.

Conventionally, the heat is removed from the hydrogen storage bed 34 by an external flow of coolants including but not limited to water. This technique requires a separate arrangement for cooling, thereby making the overall system bulky and complicated. The present system eliminates this problem by using the hydrogen for cooling the hydrogen storage vessel 22, which will is described in detail below.

As explained above with respect to FIG. 1, the hydrogen gas filing system 14 comprises a source of hydrogen 24, a hydrogen compressor 26, a heat exchanger 30 and a buffer vessel 32. The hydrogen from the source of hydrogen 24 is compressed in compressor 26, and delivered to the buffer vessel 32. Hydrogen from the buffer vessel 32 flows from to the hydrogen storage vessel 22 via the plurality of interconnecting pipelines 16, 17, and valves 18. The pressure required for flow of hydrogen to the hydrogen storage vessel 22 is made available by the buffer vessel 32, which is kept at relatively high pressure relative to the hydrogen storage vessel 22. Because of this pressure differential, the flow of hydrogen is achieved as explained earlier. Before hydrogen leaves the hydrogen filling system 14, it is cooled to a temperature below the material absorption temperature. Hydrogen delivery line 16 is thermally insulated to assure that cold hydrogen is delivered to the hydrogen storage vessel 22. Information about the pressure and temperature of the hydrogen in the hydrogen storage vessel 22 is delivered from the pressure and temperature sensors 39 to the filling system control unit 23 by the data line 21. The filling system control unit 23 controls the operation of the compressor and the heat exchanger 30. Some of the hydrogen is absorbed in the hydrogen storage metal alloy 36 disposed in the hydrogen storage bed 34 in a hydrogen storage vessel 22, whereas unabsorbed hydrogen flows back to the hydrogen source 24 via the interconnecting pipeline 17 and valves 19 to the hydrogen source 24.

In an exemplary embodiment, the hydrogen storage vessel 22 further comprises a plurality of flexible gas impenetrable flow guides 38 embedded in the hydrogen storage vessel 22 for guiding the flow of the hydrogen within the hydrogen storage bed 34. The hydrogen storage vessel 22 is thermally insulated and can be made of any light and strong material. Some of the hydrogen is adsorbed into the hydrogen storage metal alloy 36 and the excess hydrogen passes through the flow guides 38 and out the other side of the hydrogen storage vessel 22. The flow guides 38 helps in reducing the dead spots created due to the flow of hydrogen and helps in uniformly circulating the flow of hydrogen in the hydrogen storage vessel 22 for enhanced adsorption of hydrogen in the hydrogen storage bed 34. Further, as hydrogen is adsorbed into the hydrogen storage metal alloy 36, it releases through exothermic hydride formation. The heat is convectively carried away by the excess hydrogen that passes through the flow guides 38. This type of arrangement may help in better adsorption of hydrogen in the hydrogen storage vessel 22. The pressure differential between the buffer vessel 32 and the hydrogen storage vessel 22 may assist the forced flow of hydrogen. This arrangement may be referred to as an open gas circuit. Specifically, relatively cold, high-pressure hydrogen is dispensed from the buffer vessel 32 to the hydrogen storage vessel 22 through the interconnecting thermally insulated pipelines 16.

Figure 3:
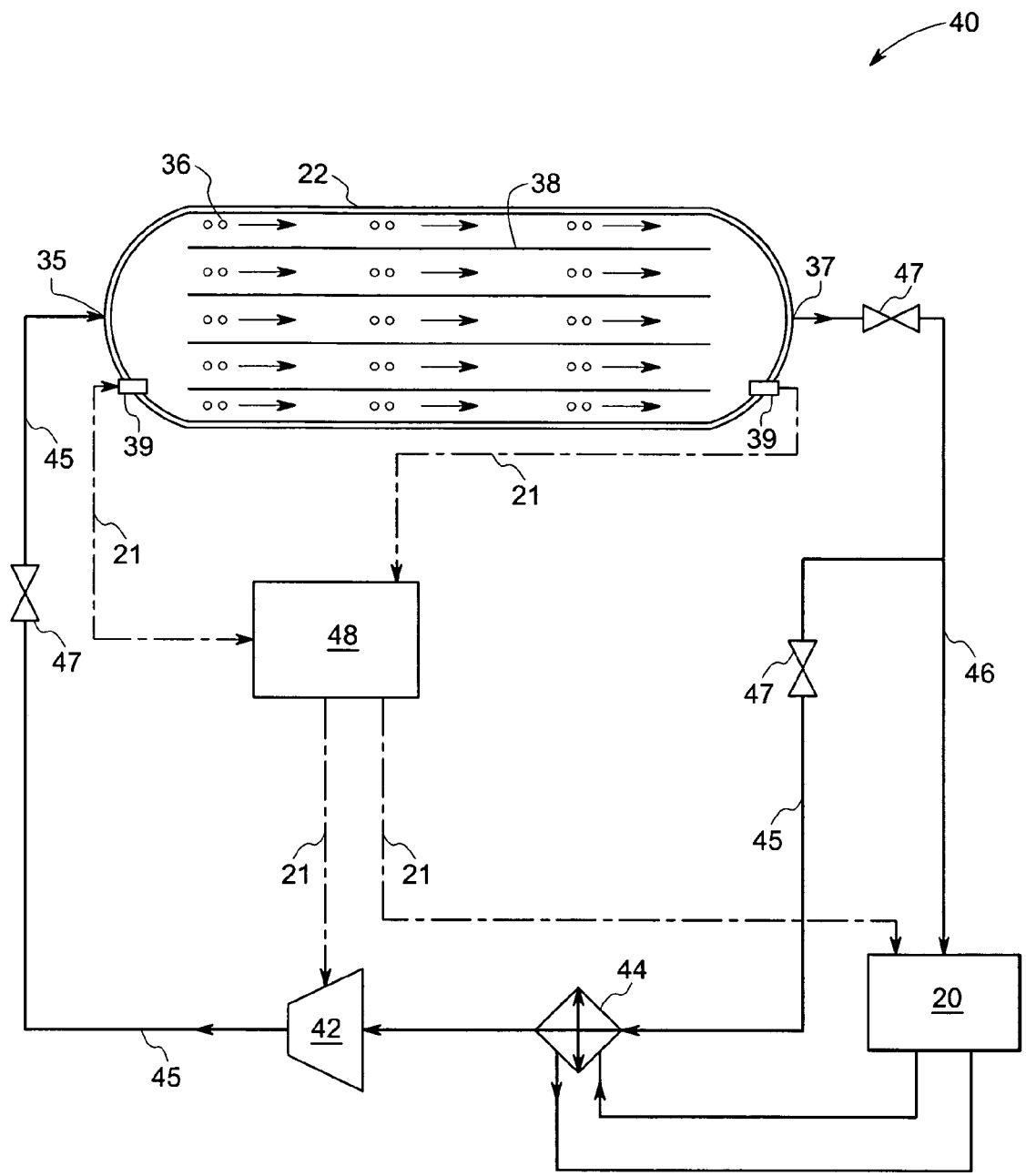
FIG. 3 is a schematic diagram of a hydrogen storage system for use in powering a power conversion unit in accordance with an exemplary embodiment of the present technique.

Referring now to FIG. 3, a schematic illustration of the hydrogen discharge system 40 is illustrated. The hydrogen discharge system 40 comprises a hydrogen storage vessel 22 a hydrogen compressor 42, a heat exchanger 44, a vehicle power conversion unit 20 and a plurality of interconnecting pipelines 45, 46, and a plurality of valves 47. The hydrogen discharge system 40 further comprises at least a sensor 39 situated coupled to the hydrogen storage vessel 22 and a discharge control unit 48. A data line 21 delivers information about pressure and temperature from the hydrogen storage vessel 22, the power conversion unit 20 and from the compressor 42 to the discharge control unit 48 for controlling the operation of the hydrogen discharge system 40.

Heat may be introduced into the hydrogen storage bed 34 of the hydrogen storage vessel 22 to release the stored hydrogen from the alloys contained therein. Generally, there are a number of ways in which this heat can be supplied. For example, an internal heater can be provided to heat the hydrogen storage bed 34. In such case engine's waste heat may be transferred from the power conversion unit 20 to the hydrogen storage vessel 22 with heat transfer liquid. The heat transfer liquid may be located remotely from the hydrogen storage vessel 22 to improve weight distribution in the vehicle. Another way to provide heat to release hydrogen from the hydrogen storage bed 34 is to use hydrogen from the storage vessel 22. Hydrogen can be burned or catalytically combusted to provide the necessary heat to release the stored hydrogen.

In one embodiment of the present technique, initial heat is supplied to a hydrogen storage vessel 22 from the exhaust of the vehicle 12. However, the present technique is adapted to be used when little or no external heat is available. In an alternate embodiment of the present technique, any other source of heat or high temperature discharge may also be employed for providing the initial heat for releasing the hydrogen from the hydrogen storage bed 34.

The vehicle power conversion unit 20 as illustrated in FIG. 3 provides the initial heat to the hydrogen storage bed 34 releasing an initial amount of hydrogen from the hydrogen storage metal alloy 36 disposed in the hydrogen storage bed 34 of the hydrogen storage vessel 22. The heat generated releases stored hydrogen from the hydrogen storage metal alloy 36, which is fed into the vehicle power conversion unit 20. The warmth of the vehicle engine may be used to release the initial hydrogen, which begins a continuous cycle. This is referred to as an open gas circuit during discharging of hydrogen from the hydrogen storage vessel 22. In one embodiment, the released hydrogen from the hydrogen storage bed 34 is used for a fuel cell to power the vehicle 12. In another embodiment of the present technique, the hydrogen released from the hydrogen storage bed 34 can be utilized to run a turbine and any such similar application. A plurality of valves 47 may be adapted for flow control and safe operation of the hydrogen discharge system, as will be recognized by those of ordinary skill in the art. Multiple valves 48 and pressure regulators may achieve pressure control of hydrogen in the interconnecting pipelines 45 and 46.

Figure 4:
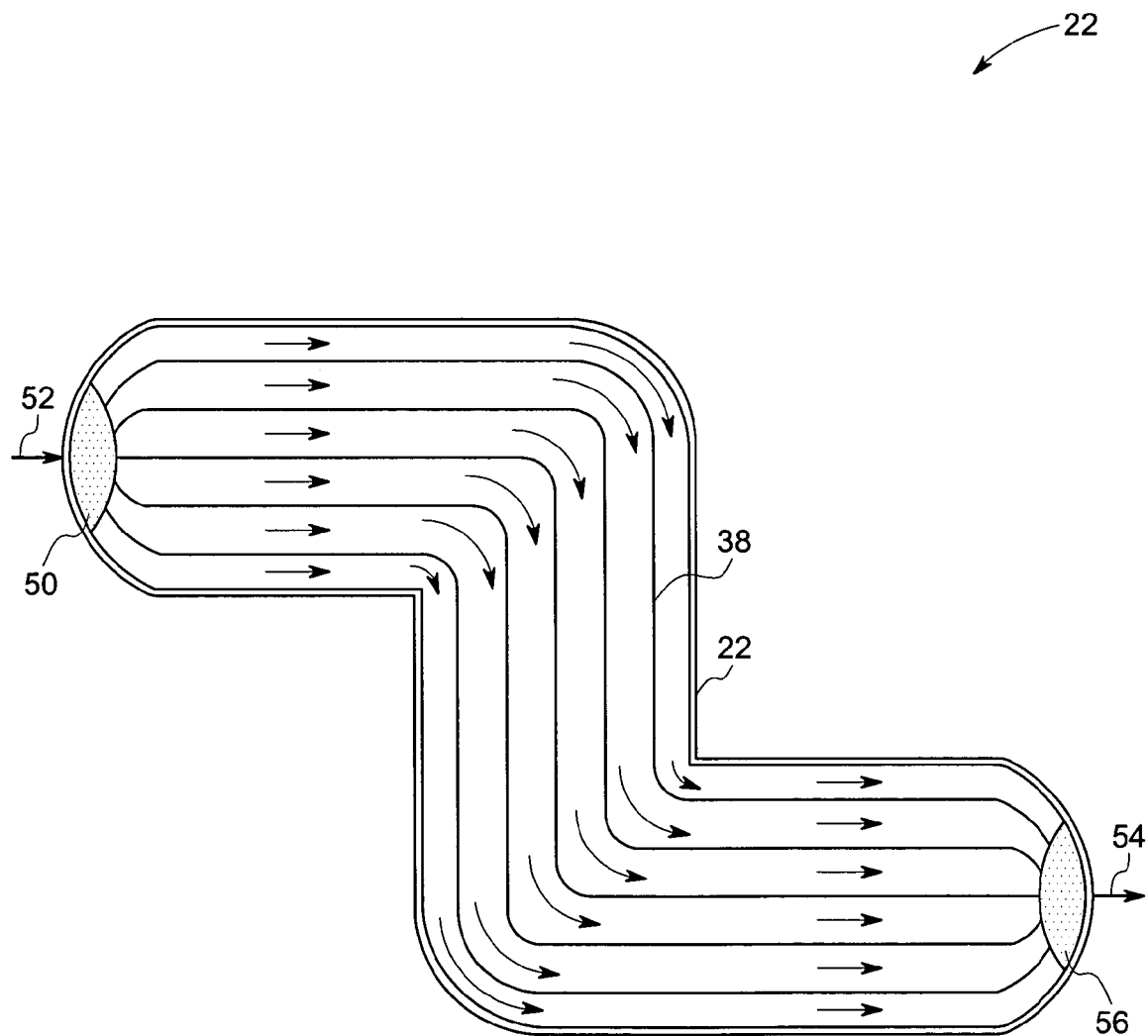
FIG. 4 is a schematic diagram of a hydrogen storage vessel in accordance with an exemplary embodiment of the present technique.

FIG. 4 is a schematic diagram of a hydrogen storage vessel in accordance with an exemplary embodiment of the present technique. The hydrogen storage vessel 22 comprises of an inlet filter 50, a plurality of flexible gas impenetrable flow guides 38 embedded in the hydrogen storage vessel 22 for guiding the flow of the hydrogen within the hydrogen storage bed 34. Some of the hydrogen is adsorbed into the hydrogen storage metal alloy 36 and the excess unabsorbed hydrogen 54 passes through the flow guides 38, is filtered in the outlet filter 56, and moves to the other side. The flow guides 38 may be constructed in such a way to avoid any dead spots being created in the hydrogen storage vessel 22. In addition to this, as the flow guides 38 are embedded in the hydrogen storage vessel 22, there is no restriction in the flow and the flow is uniformly distributed. In addition, the shape of the hydrogen storage vessel 22 can be modified to suit the space available in the vehicle 12. The FIG. 4 illustrates an exemplary embodiment of one such hydrogen storage vessel 22. There can be many such shapes depending on the storage availability of the vehicle 12.

Figure 5:
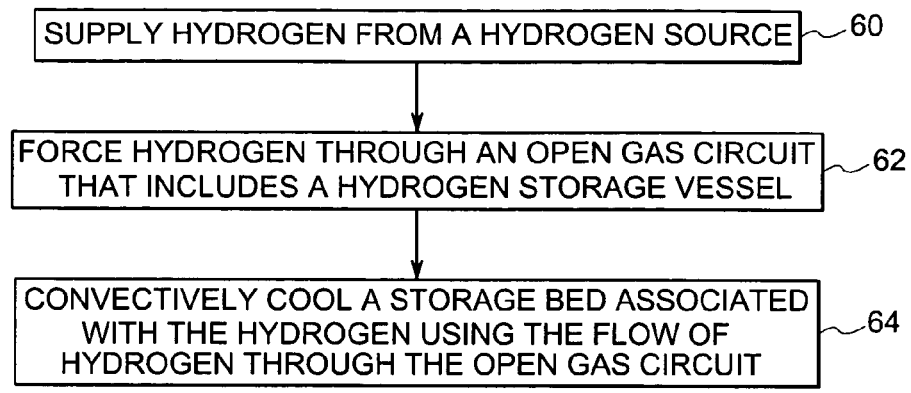
FIG. 5 is a flow chart illustrating an exemplary process of charging hydrogen gas into a hydrogen storage vessel in accordance with embodiment of the present technique.

FIG. 5 illustrates a method 58 of charging of hydrogen gas in the hydrogen storage vessel 22. At step 60, hydrogen is supplied from a hydrogen source. At step 62, the hydrogen is convectively forced through an open gas circuit that includes a hydrogen storage vessel 22 as explained in earlier sections. The hydrogen storage bed 34 is cooled through convection with the aid of hydrogen through the open gas circuit as explained in step 64.

Figure 6:
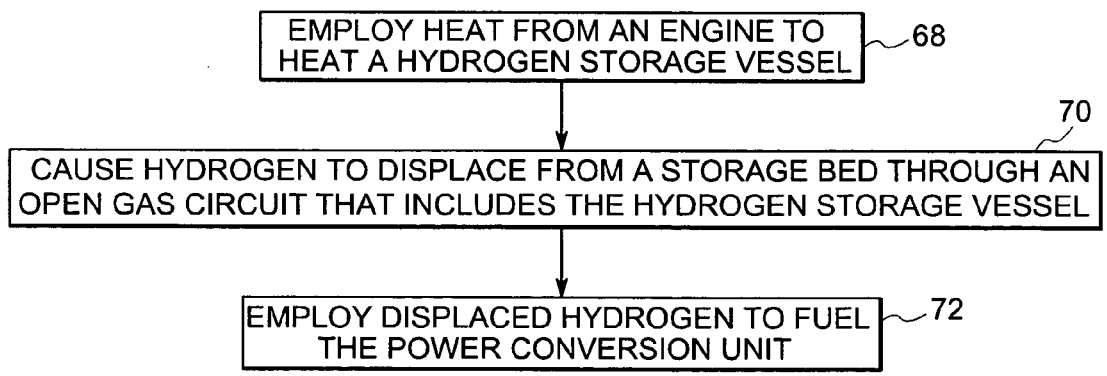
FIG. 6 is a flow chart illustrating an exemplary process of discharging hydrogen gas into a hydrogen storage vessel in accordance with embodiment of the present technique.

FIG. 6 illustrates a method 66 of discharging hydrogen in the hydrogen storage vessel 22. As set forth at step 68, heat is employed from a vehicle power conversion unit 20 to heat a hydrogen storage vessel 22 and this causes hydrogen to displace from the hydrogen storage bed 34 through an open gas circuit that includes the hydrogen storage vessel 22 as set forth at step 70. At step 72, the hydrogen is displaced from a hydrogen storage bed 34 disposed in the hydrogen storage vessel 22.

The techniques described above provide a system and method for charging and discharging hydrogen from the hydrogen storage bed 34 disposed in the hydrogen storage vessel 22. The system helps in eliminating separate water-cooling circuits, thus reducing the overall weight of the hydrogen fuel system 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A hydrogen fuel system, comprising:
   an open gas circuit that includes a source of hydrogen;
   a compressor that forces a flow of hydrogen from the source of hydrogen through the open gas circuit; and
   a hydrogen storage vessel comprising an inlet and an outlet, a hydrogen storage bed being disposed within the hydrogen storage vessel between the inlet and the outlet, the hydrogen storage vessel being adapted to form a portion of the open gas circuit so that the hydrogen storage bed is cooled by convection while hydrogen flows through the open gas circuit.

2. The system according to claim 1, wherein the hydrogen storage bed comprises a hydrogen storage metal alloy that comprises a hydride selected from the group comprising of $AB, AB_2, AB_5, A_2B$ and $M_x(AlH_3)_y H_z$ and $AlH_3$, or a combination of the above where A, B, and M are metals and the value of x lies between 1 and 3, the value of y lies between 1 and 2 and the value of z lies between the value of x and twice the value of x.

3. The system according to claim 1, wherein the inlet and the outlet of the hydrogen storage vessel are located at opposite ends of the hydrogen storage vessel.

4. The system according to claim 1, further comprising a buffer vessel, wherein the buffer vessel is adapted to recapture unabsorbed hydrogen from the hydrogen storage bed during charging and to maintain a pressure differential to assist a flow of hydrogen through the open gas circuit.

5. The system according to claim 1, wherein the flow of hydrogen proceeds in a single direction between the inlet and the outlet.

6. The system according to claim 1, wherein the hydrogen storage vessel is disposed in a vehicle.

7. The system according to claim 1, wherein the hydrogen storage vessel has an irregular shape to accommodate its disposition in the vehicle.

8. The system according to claim 1, wherein a heat exchanger is disposed in the hydrogen fuel system and is adapted to utilize hydrogen gas from the vehicle to cool the system during charging of the hydrogen into the hydrogen storage vessel.

9. The system according to claim 8, wherein the heat exchanger is adapted to utilize hydrogen as a coolant.

10. The system according to claim 1, wherein the hydrogen storage vessel comprises a plurality of flexible gas impenetrable flow guides embedded in the hydrogen storage vessel to guide a flow of the hydrogen through the hydrogen storage bed.

11. The system according to claim 10, wherein the flow guides are configured to provide a uniform flow of hydrogen in the hydrogen storage vessel.

12. The system according to claim 1, further comprising a plurality of valves for control of a flow of the hydrogen and a plurality of interconnecting pipelines for flow transfer of hydrogen in the hydrogen storage vessel.

13. The system according to claim 1, wherein the hydrogen storage vessel is adapted for use in powering a power conversion unit.

14. The system according to claim 13, wherein the power conversion unit comprises an internal combustion unit.

15. The system according to claim 13, wherein the power conversion unit comprises a fuel cell.

16. A hydrogen storage vessel adapted for use in a hydrogen fuel system, the hydrogen storage vessel comprising:
   an inlet disposed to allow hydrogen to flow into the hydrogen storage vessel;
   an outlet disposed to allow hydrogen to flow out of the hydrogen storage vessel; and
   a hydrogen storage bed being disposed within the hydrogen storage vessel between the inlet and the outlet, the hydrogen storage vessel being adapted to form a portion of an open gas circuit so that the hydrogen storage bed is cooled by convection by a flow of hydrogen through the open gas circuit;
   wherein the hydrogen storage bed comprises a hydrogen storage metal alloy that comprises a hydride selected from the group comprising of $AB, AB_2, AB_5, A_2B$ and $M_x(AlH_3)_yH_z$ and $AlH_3$, or a combination of the above where A, B, and M are metals and the value of x lies between 1 and 3, the value of y lies between 1 and 2 and the value of z lies between the value of x and twice the value of x.

17. The hydrogen storage vessel according to claim 16, wherein the inlet and the outlet of the hydrogen storage vessel are located at opposite ends of the hydrogen storage vessel.

18. The hydrogen storage vessel according to claim 16, wherein the hydrogen storage vessel comprises a plurality of flexible gas impenetrable flow guides embedded in the hydrogen storage vessel for guiding a flow of hydrogen within the hydrogen storage bed.

19. The hydrogen storage vessel according to claim 18, wherein the flow guides are configured to provide a uniform flow of hydrogen in the hydrogen storage vessel.

20. The hydrogen storage vessel according to claim 16, further comprising a plurality of valves for control of a flow of hydrogen and a plurality of interconnecting pipelines for flow transfer of hydrogen in the hydrogen storage vessel.

21. The hydrogen storage vessel according to claim 16, wherein the flow of hydrogen proceeds in a single direction between the inlet and the outlet.

22. The hydrogen storage vessel according to claim 16, wherein the hydrogen storage vessel is disposed in a vehicle.

23. The system according to claim 16, wherein the hydrogen storage vessel has an irregular shape to accommodate its disposition in the vehicle.

24. A method of operating a hydrogen fuel system, the method comprising:
   providing a flow of hydrogen through an open gas circuit that comprises a hydrogen storage vessel; and
   convectively cooling a hydrogen storage bed using the flow of hydrogen;
   wherein the hydrogen storage bed comprises a hydrogen storage metal alloy that comprises a hydride selected from the group comprising of $AB, AB_2, AB_5, A_2B$ and $M_x(AlH_3)_yH_z$ and $AlH_3$, or a combination of the above where A, B, and M are metals and the value of x lies between 1 and 3, the value of y lies between 1 and 2 and the value of z lies between the value of x and twice the value of x.

25. The method according to claim 24, wherein the open gas circuit comprises a source of hydrogen.

26. The method according to claim 24, wherein the open gas circuit comprises a hydrogen storage vessel having an inlet and an outlet, a hydrogen storage bed being disposed within the hydrogen storage vessel between the inlet and the outlet, the hydrogen storage vessel being adapted to form a portion of the open gas circuit.

27. The method according to claim 26, wherein the inlet and the outlet of the hydrogen storage vessel are located at opposite ends of a hydrogen storage vessel.

28. The method according to claim 24, wherein the open gas circuit comprises a buffer vessel adapted to recapture unabsorbed hydrogen from the hydrogen storage bed during charging and to maintain a pressure differential to assist a flow of hydrogen through the open gas circuit.

29. The method according to claim 24, wherein the open gas circuit comprises a hydrogen storage vessel disposed in a vehicle.

30. The method according to claim 29, wherein the hydrogen storage vessel has an irregular shape to accommodate its disposition in the vehicle.

31. The method according to claim 24, wherein a heat exchanger is disposed in the hydrogen fuel system, the heat exchanger being adapted to utilize hydrogen from the vehicle to cool the hydrogen fuel system during charging of the hydrogen into the hydrogen storage bed.

32. The method according to claim 31, wherein the heat exchanger is designed to utilize hydrogen as a coolant.

33. The method according to claim 24, wherein the open gas circuit comprises a hydrogen storage vessel comprising a plurality of flexible gas impenetrable flow guides embedded in the hydrogen storage vessel for guiding a flow of hydrogen within the hydrogen storage bed.

34. The method according to claim 33, wherein the flow guides are configured to provide a uniform flow of hydrogen in the hydrogen fuel system.

35. The method according to claim 24, comprising a plurality of valves to control a flow of hydrogen and a plurality of interconnecting pipelines for flow transfer of hydrogen in the hydrogen fuel system.

36. A method of operating a power conversion unit, comprising:
heating a hydrogen storage bed to cause desorption of hydrogen from the hydrogen storage bed;
causing hydrogen from the hydrogen storage bed to flow through an open gas circuit to convectively warm the hydrogen storage bed; and
providing hydrogen from the hydrogen storage bed as fuel to the power conversion unit, wherein the hydrogen storage bed comprises
a hydrogen storage vessel having an inlet and an outlet, the hydrogen storage vessel being adapted to form a portion of the open gas circuit.

37. The method according to claim 36, wherein the power conversion unit comprises an internal combustion engine and the hydrogen storage bed is adapted for use in powering the power conversion unit.

38. The method according to claim 36, wherein the power conversion unit comprises a fuel cell and the hydrogen storage bed is adapted for use in powering the power conversion unit.

39. The method according to claim 37, wherein the hydrogen storage bed comprises a portion of a hydrogen fuel system that includes a heat exchanger adapted to utilize hydrogen from the power conversion unit to cool the hydrogen fuel system during charging of the hydrogen into the hydrogen storage bed.

40. The method according to claim 36, wherein the hydrogen storage bed is disposed inside a hydrogen storage vessel.

41. The method according to claim 36, wherein the hydrogen storage vessel comprises a plurality of flexible gas impenetrable flow guides embedded in the hydrogen storage vessel for guiding a flow of hydrogen within the hydrogen storage bed.

42. The method according to claim 41, wherein the flow guides are configured to provide a uniform flow of hydrogen in the hydrogen storage vessel.

43. The method according to claim 36, further comprising a plurality of valves for control of a flow of the hydrogen and a plurality of interconnecting pipelines for flow transfer of hydrogen in the hydrogen storage vessel.

44. The method according to claim 36, wherein the open gas circuit comprises a source of hydrogen.

45. The method according to claim 36, wherein the hydrogen storage bed comprises a hydrogen storage metal alloy that comprises a hydride selected from the group comprising of AB, AB2, $AB_5$, A2B and $M_x(AlH_3)_y H_z$ and $AlH_3$, or a combination of the above where A, B, and M are metals and the value of x lies between 1 and 3, the value of y lies between 1 and 2 and the value of z lies between the value of x and twice the value of x.

* * * * *